(12) United States Patent
Wong

(10) Patent No.: US 11,353,664 B1
(45) Date of Patent: Jun. 7, 2022

(54) FIBER OPTIC CONNECTOR

(71) Applicant: Senko Advanced Components, Inc., Marlborough, MA (US)

(72) Inventor: Yim Wong, Kowloon (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/998,751

(22) Filed: Aug. 20, 2020

Related U.S. Application Data

(60) Provisional application No. 62/889,636, filed on Aug. 21, 2019.

(51) Int. Cl.
*G02B 6/38* (2006.01)

(52) U.S. Cl.
CPC ......... *G02B 6/3869* (2013.01); *G02B 6/3831* (2013.01)

(58) Field of Classification Search
None
See application file for complete search history.

(56) References Cited

U.S. PATENT DOCUMENTS

| 987,766 A | 3/1911 | Spiro |
|---|---|---|
| 3,721,945 A | 3/1973 | Hults |
| 4,150,790 A | 4/1979 | Potter |
| 4,327,964 A | 5/1982 | Haesly |
| 4,478,473 A | 10/1984 | Frear |
| 4,762,388 A | 8/1988 | Tanaka |
| 4,764,129 A | 8/1988 | Jones |
| 4,840,451 A | 6/1989 | Sampson |
| 4,844,570 A | 7/1989 | Tanabe |
| 4,872,736 A | 10/1989 | Myers |
| 4,979,792 A | 12/1990 | Weber |
| 5,041,025 A | 8/1991 | Haitmanek |
| 5,074,637 A | 12/1991 | Rink |
| D323,143 S | 1/1992 | Ohkura |
| 5,212,752 A | 5/1993 | Stephenson |
| 5,265,181 A | 11/1993 | Chang |
| 5,280,552 A | 1/1994 | Yokoi |
| 5,289,554 A | 2/1994 | Cubukciyan |
| 5,317,663 A | 5/1994 | Beard |
| 5,335,301 A | 8/1994 | Newman |
| 5,348,487 A | 9/1994 | Marazzi |
| 5,444,806 A | 8/1995 | de Marchi |
| 5,481,634 A | 1/1996 | Anderson |
| 5,506,922 A | 4/1996 | Grois |
| 5,521,997 A | 5/1996 | Rovenolt |
| 5,570,445 A | 10/1996 | Chou |
| 5,588,079 A | 12/1996 | Tanabe |
| 5,684,903 A | 11/1997 | Kyomasu |
| 5,687,268 A | 11/1997 | Stephenson |
| 5,781,681 A | 7/1998 | Manning |
| 5,915,056 A | 6/1999 | Bradley |

(Continued)

*Primary Examiner* — Tina M Wong

(57) ABSTRACT

A fiber optic connector includes a housing having proximal and distal ends and a latch for securing the fiber optic connector to an adapter housing. A ferrule forms an optical connection with a second fiber optic connector. The ferrule is disposed distally of the housing. A spring holder operatively couples the ferrule to the housing. The spring holder is movable relative to at least one of the housing and the ferrule to enable the ferrule to move proximally and distally relative to the housing. A spring biases the ferrule in a distal direction away from the housing. The spring is mounted on the spring holder.

14 Claims, 7 Drawing Sheets

(56) References Cited

U.S. PATENT DOCUMENTS

| | | | |
|---|---|---|---|
| 5,937,130 A | 8/1999 | Amberg |
| 5,956,444 A | 9/1999 | Duda |
| 5,971,626 A | 10/1999 | Knodell |
| 6,041,155 A | 3/2000 | Anderson |
| 6,049,040 A | 4/2000 | Biles |
| 6,134,370 A | 10/2000 | Childers |
| 6,178,283 B1 | 1/2001 | Weigel |
| 6,186,670 B1 | 2/2001 | Austin |
| RE37,080 E | 3/2001 | Stephenson |
| 6,206,577 B1 | 3/2001 | Hall, III |
| 6,206,581 B1 | 3/2001 | Driscoll |
| 6,227,717 B1 | 5/2001 | Ott |
| 6,238,104 B1 | 5/2001 | Yamakawa |
| 6,247,849 B1 | 6/2001 | Liu |
| 6,347,888 B1 | 2/2002 | Puetz |
| 6,461,054 B1 | 10/2002 | Iwase |
| 6,471,412 B1 | 10/2002 | Belenkiy |
| 6,478,472 B1 | 11/2002 | Anderson |
| 6,530,696 B1 * | 3/2003 | Ueda .................. G02B 6/3885 385/59 |
| 6,551,117 B2 | 4/2003 | Poplawski |
| 6,579,014 B2 | 6/2003 | Melton |
| 6,634,801 B1 | 10/2003 | Waldron |
| 6,648,520 B2 | 11/2003 | McDonald |
| 6,682,228 B2 | 1/2004 | Rathnam |
| 6,685,362 B2 | 2/2004 | Burkholder |
| 6,695,486 B1 | 2/2004 | Falkenberg |
| 6,785,460 B2 | 8/2004 | de Jong |
| 6,817,780 B2 | 11/2004 | Ngo |
| 6,854,894 B1 | 2/2005 | Yunker |
| 6,872,039 B2 | 3/2005 | Baus |
| 6,935,789 B2 | 8/2005 | Gross, III |
| 7,020,376 B1 | 3/2006 | Dang |
| 7,036,993 B2 | 5/2006 | Luther |
| 7,077,576 B2 | 7/2006 | Luther |
| 7,090,406 B2 | 8/2006 | Melton |
| 7,090,407 B2 | 8/2006 | Melton |
| 7,091,421 B2 | 8/2006 | Kukita |
| 7,111,990 B2 | 9/2006 | Melton |
| 7,113,679 B2 | 9/2006 | Melton |
| D533,504 S | 12/2006 | Lee |
| D534,124 S | 12/2006 | Taguchi |
| 7,150,567 B1 | 12/2006 | Luther |
| 7,153,041 B2 | 12/2006 | Mine |
| 7,207,724 B2 | 4/2007 | Gurreri |
| D543,146 S | 5/2007 | Chen |
| 7,241,956 B1 | 7/2007 | Stimpson |
| 7,258,493 B2 | 8/2007 | Milette |
| 7,264,402 B2 | 9/2007 | Theuerkorn |
| 7,281,859 B2 | 10/2007 | Mudd |
| D558,675 S | 1/2008 | Chien |
| 7,315,682 B1 | 1/2008 | En Lin |
| 7,325,976 B2 | 2/2008 | Gurreri |
| 7,325,980 B2 | 2/2008 | Pepe |
| 7,329,137 B2 | 2/2008 | Martin |
| 7,331,718 B2 | 2/2008 | Yazaki |
| 7,354,291 B2 | 4/2008 | Caveney |
| 7,371,082 B2 | 5/2008 | Zimmel |
| 7,387,447 B2 | 6/2008 | Mudd |
| 7,390,203 B2 | 6/2008 | Murano |
| D572,661 S | 7/2008 | En Lin |
| 7,431,604 B2 | 10/2008 | Waters |
| 7,463,803 B2 | 12/2008 | Cody |
| 7,465,180 B2 | 12/2008 | Kusuda |
| 7,510,335 B1 | 3/2009 | Su |
| 7,513,695 B1 | 4/2009 | Lin |
| 7,540,666 B2 | 6/2009 | Luther |
| 7,561,775 B2 | 7/2009 | Lin |
| 7,591,595 B2 | 9/2009 | Lu |
| 7,594,766 B1 | 9/2009 | Sasser |
| 7,641,398 B2 | 1/2010 | O'Riorden |
| 7,654,748 B2 | 2/2010 | Kuffel |
| 7,695,199 B2 | 4/2010 | Teo |
| 7,699,533 B2 | 4/2010 | Milette |
| 7,785,019 B2 | 8/2010 | Lewallen |
| 7,824,113 B2 | 11/2010 | Wong |
| 7,837,395 B2 | 11/2010 | Lin |
| D641,708 S | 7/2011 | Yamauchi |
| 8,186,890 B2 | 5/2012 | Lu |
| 8,192,091 B2 | 6/2012 | Hsu |
| 8,202,009 B2 | 6/2012 | Lin |
| 8,224,146 B2 | 7/2012 | Hackett |
| 8,251,733 B2 | 8/2012 | Wu |
| 8,267,595 B2 | 9/2012 | Lin |
| 8,270,796 B2 | 9/2012 | Nhep |
| 8,408,815 B2 | 4/2013 | Lin |
| 8,465,317 B2 | 6/2013 | Gniadek |
| 8,534,928 B2 | 9/2013 | Cooke |
| 8,556,520 B2 | 10/2013 | Elenbaas |
| 8,622,634 B2 | 1/2014 | Arnold |
| 8,636,424 B2 | 1/2014 | Kuffel |
| 8,636,425 B2 | 1/2014 | Nhep |
| 8,651,749 B2 | 2/2014 | Dainese Júnior |
| 8,678,670 B2 | 3/2014 | Takahashi |
| 8,770,863 B2 | 7/2014 | Cooke |
| 8,855,458 B2 | 10/2014 | Belenkiy |
| 9,239,437 B2 | 1/2016 | Belenkiy |
| 9,383,539 B2 | 7/2016 | Hill |
| 9,618,702 B2 | 4/2017 | Takano |
| 9,618,703 B2 | 4/2017 | Iizumi |
| 9,658,409 B2 | 5/2017 | Gniadek |
| 9,772,457 B2 | 9/2017 | Hill |
| 9,778,090 B2 | 10/2017 | Hirt |
| 9,778,425 B2 | 10/2017 | Nguyen |
| 9,798,090 B2 | 10/2017 | Takano |
| 9,798,094 B2 | 10/2017 | Kuffel |
| 9,933,582 B1 | 4/2018 | Lin |
| 9,939,589 B2 | 4/2018 | Takano |
| 9,977,199 B2 | 5/2018 | Chang |
| 11,099,332 B1 * | 8/2021 | Kuprin ................ G02B 6/3826 |
| 2001/0010741 A1 | 8/2001 | Hizuka |
| 2002/0191919 A1 | 12/2002 | Nolan |
| 2003/0000077 A1 | 1/2003 | Perry |
| 2003/0053787 A1 | 3/2003 | Lee |
| 2003/0063867 A1 | 4/2003 | McDonald |
| 2003/0147598 A1 | 8/2003 | McPhee |
| 2003/0156796 A1 | 8/2003 | Rathnam |
| 2003/0161586 A1 | 8/2003 | Hirabayashi |
| 2004/0047566 A1 | 3/2004 | McDonald |
| 2004/0052473 A1 | 3/2004 | Seo |
| 2004/0136657 A1 | 7/2004 | Ngo |
| 2004/0141693 A1 | 7/2004 | Szilagyi |
| 2004/0161958 A1 | 8/2004 | Togami |
| 2004/0234209 A1 | 11/2004 | Cox |
| 2004/0264873 A1 | 12/2004 | Smith |
| 2005/0111796 A1 | 5/2005 | Matasek |
| 2005/0141817 A1 | 6/2005 | Yazaki |
| 2005/0213897 A1 | 9/2005 | Palmer |
| 2006/0089049 A1 | 4/2006 | Sedor |
| 2006/0127025 A1 | 6/2006 | Haberman |
| 2006/0269194 A1 | 11/2006 | Luther |
| 2006/0274411 A1 | 12/2006 | Yamauchi |
| 2007/0025665 A1 | 2/2007 | Dean |
| 2007/0028409 A1 | 2/2007 | Yamada |
| 2007/0079854 A1 | 4/2007 | You |
| 2007/0098329 A1 | 5/2007 | Shimoji |
| 2007/0149062 A1 | 6/2007 | Long |
| 2007/0230874 A1 | 10/2007 | Lin |
| 2007/0232115 A1 | 10/2007 | Burke |
| 2007/0243749 A1 | 10/2007 | Wu |
| 2008/0008430 A1 | 1/2008 | Kewitsch |
| 2008/0026647 A1 | 1/2008 | Boehnlein |
| 2008/0044137 A1 | 2/2008 | Luther |
| 2008/0069501 A1 | 3/2008 | Mudd |
| 2008/0101757 A1 | 5/2008 | Lin |
| 2008/0112682 A1 * | 5/2008 | Ishii .................. G02B 6/3879 385/137 |
| 2008/0226237 A1 | 9/2008 | O'Riorden |
| 2008/0267566 A1 | 10/2008 | En Lin |
| 2009/0022457 A1 | 1/2009 | de Jong |
| 2009/0028507 A1 | 1/2009 | Jones |
| 2009/0148101 A1 | 6/2009 | Lu |
| 2009/0196555 A1 | 8/2009 | Lin |
| 2009/0214162 A1 | 8/2009 | O'Riorden |

(56) References Cited

U.S. PATENT DOCUMENTS

| | | |
|---|---|---|
| 2009/0220197 A1 | 9/2009 | Gniadek |
| 2009/0226140 A1 | 9/2009 | Belenkiy |
| 2009/0269014 A1 | 10/2009 | Winberg |
| 2010/0034502 A1 | 2/2010 | Lu |
| 2010/0092136 A1 | 4/2010 | Nhep |
| 2010/0129031 A1 | 5/2010 | Danley |
| 2010/0215322 A1 | 8/2010 | Matsumoto |
| 2010/0247041 A1 | 9/2010 | Szilagyi |
| 2010/0322561 A1 | 12/2010 | Lin |
| 2011/0044588 A1 | 2/2011 | Larson |
| 2011/0081119 A1 | 4/2011 | Togami |
| 2011/0131801 A1 | 6/2011 | Nelson |
| 2011/0177710 A1 | 7/2011 | Tobey |
| 2012/0099822 A1 | 4/2012 | Kuffel |
| 2012/0128305 A1 | 5/2012 | Cooke |
| 2012/0189260 A1 | 7/2012 | Kowalczyk |
| 2012/0269485 A1 | 10/2012 | Haley |
| 2012/0301080 A1 | 11/2012 | Gniadek |
| 2013/0071067 A1 | 3/2013 | Lin |
| 2013/0089995 A1 | 4/2013 | Gniadek |
| 2013/0094816 A1 | 4/2013 | Lin |
| 2013/0121653 A1 | 5/2013 | Shitama |
| 2013/0136401 A1* | 5/2013 | Cooke .................. G02B 6/3636 385/80 |
| 2013/0170797 A1 | 7/2013 | Ott |
| 2013/0183012 A1 | 7/2013 | Cabanne Lopez |
| 2013/0216185 A1 | 8/2013 | Klavuhn |
| 2013/0322825 A1 | 12/2013 | Cooke |
| 2014/0016901 A1 | 1/2014 | Lambourn |
| 2014/0023322 A1 | 1/2014 | Gniadek |
| 2014/0050446 A1 | 2/2014 | Chang |
| 2014/0133808 A1 | 5/2014 | Hill |
| 2014/0334780 A1 | 11/2014 | Nguyen |
| 2014/0348477 A1 | 11/2014 | Chang |
| 2015/0023646 A1 | 1/2015 | Belenkiy |
| 2015/0078717 A1 | 3/2015 | Lin |
| 2015/0117467 A1 | 4/2015 | Leung |
| 2015/0241642 A1 | 8/2015 | Hikosaka |
| 2015/0355417 A1 | 12/2015 | Takano |
| 2015/0378113 A1 | 12/2015 | Good |
| 2016/0041349 A1 | 2/2016 | Pimpinella |
| 2016/0259135 A1 | 9/2016 | Gniadek |
| 2017/0091671 A1 | 3/2017 | Mitarai |
| 2017/0254966 A1 | 9/2017 | Gniadek |
| 2018/0011261 A1 | 1/2018 | Hill |
| 2019/0064447 A1* | 2/2019 | Chang .................. G02B 6/3825 |
| 2019/0331863 A1* | 10/2019 | Anderson ............ G02B 6/3861 |
| 2019/0346633 A1* | 11/2019 | Cloud .................. G02B 6/3825 |
| 2021/0263237 A1* | 8/2021 | Chen .................... G02B 6/3826 |

* cited by examiner

FIBER OPTIC CONNECTOR

CROSS-REFERENCE TO RELATED APPLICATION

This application claims priority to U.S. Provisional App. No. 62/889,636, filed Aug. 21, 2019, the entirety of which is hereby incorporated by reference.

FIELD

The present disclosure generally relates to fiber optic connections, and, more specifically, to a fiber optic connector.

BACKGROUND

Optical connectors are used within optical communication networks to interconnect optical cables to optical devices or other optical cables. Optical connections typically involve two optical connectors connected together. These optical connectors may include a spring to bias the ferrules of two connected optical connectors toward one another to help protect the ferrules and maintain the optical connection between the optical connectors.

SUMMARY

In one aspect, a fiber optic connector comprises a housing having proximal and distal ends and a latch configured to secure the fiber optic connector to an adapter housing. A ferrule is configured to form an optical connection with a second fiber optic connector. The ferrule is disposed distally of the housing. A spring holder operatively couples the ferrule to the housing. The spring holder is movable relative to at least one of the housing and the ferrule to enable the ferrule to move proximally and distally relative to the housing. A spring biases the ferrule in a distal direction away from the housing. The spring is mounted on the spring holder.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
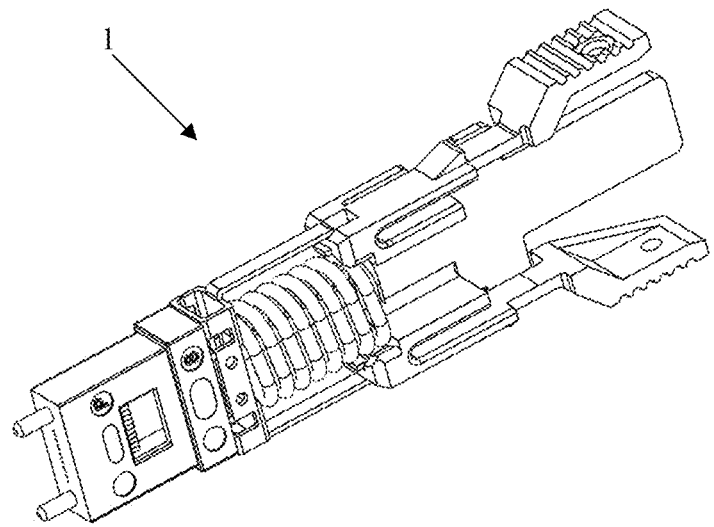
FIG. 1 is a perspective of a prior art fiber optic connector.
Figure 2:
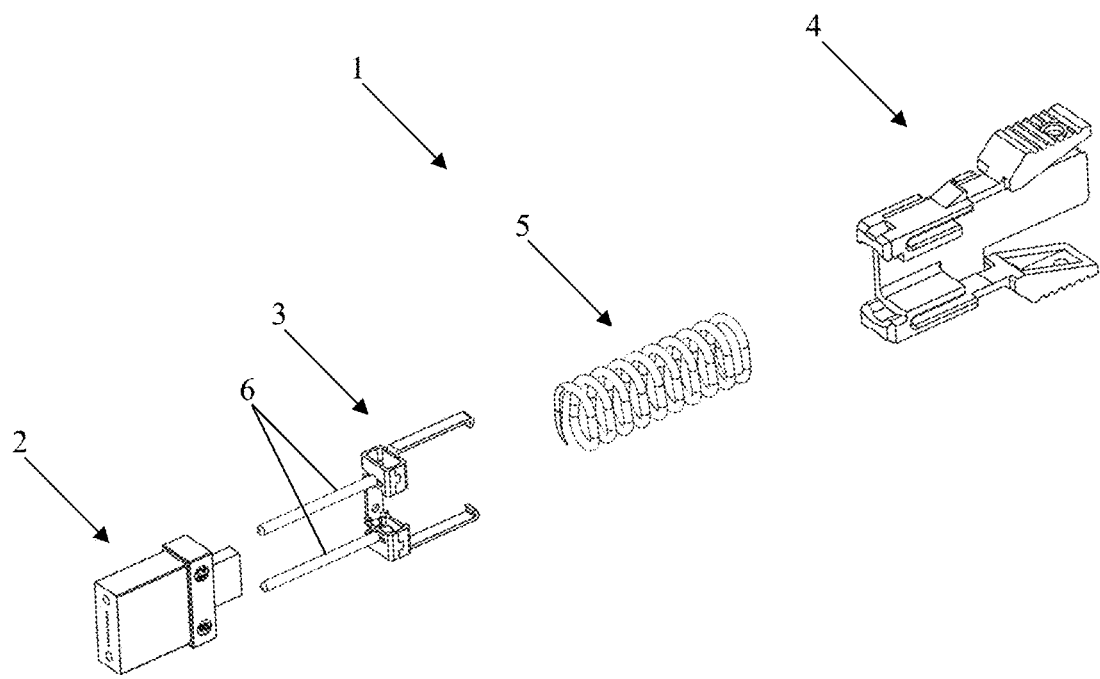
FIG. 2 is an exploded view of the prior art fiber optic connector.

Referring to FIGS. 1 and 2, a prior art fiber optic connector 1 is generally shown. The fiber optic connector 1 includes a ferrule 2 for forming an optical connection to a second fiber optic connector (not shown), a pin keeper 3 attached to the ferrule, a housing 4 and a single spring 5 biasing the pin keeper and ferrule away from the housing. The pin keeper 3 includes pins 6 extending through the ferrule for forming a mechanical transfer (MT) connection with the second fiber optic connector. The ferrule 2 is connected to a fiber optic cable (not shown), such as a ribbon cable, that extends proximally through fiber optic connector 1 and out of the housing 4. The spring 5 is an oblong coil spring defining an interior through which the fiber optic cable extends through. The spring 5 biases the pin keeper 3 and ferrule 2 distally, away from the housing, and into engagement with a second fiber optic connector to help maintain the fiber optic connection between the two connectors.

Figure 3:
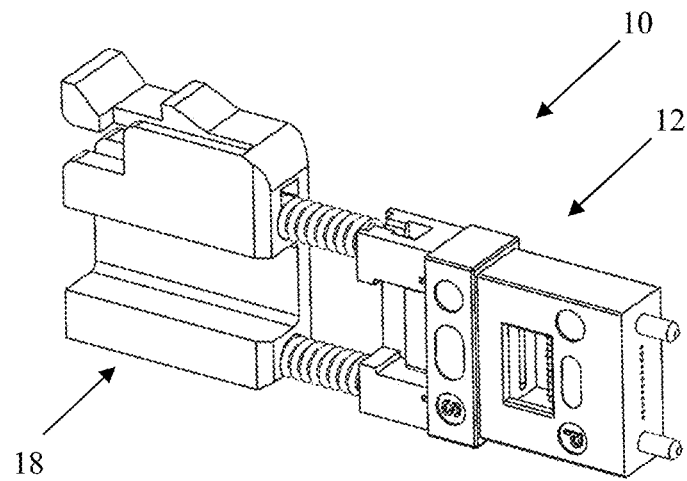
FIG. 3 is a perspective of a fiber optic connector according to one embodiment of the present disclosure.
Figure 4:
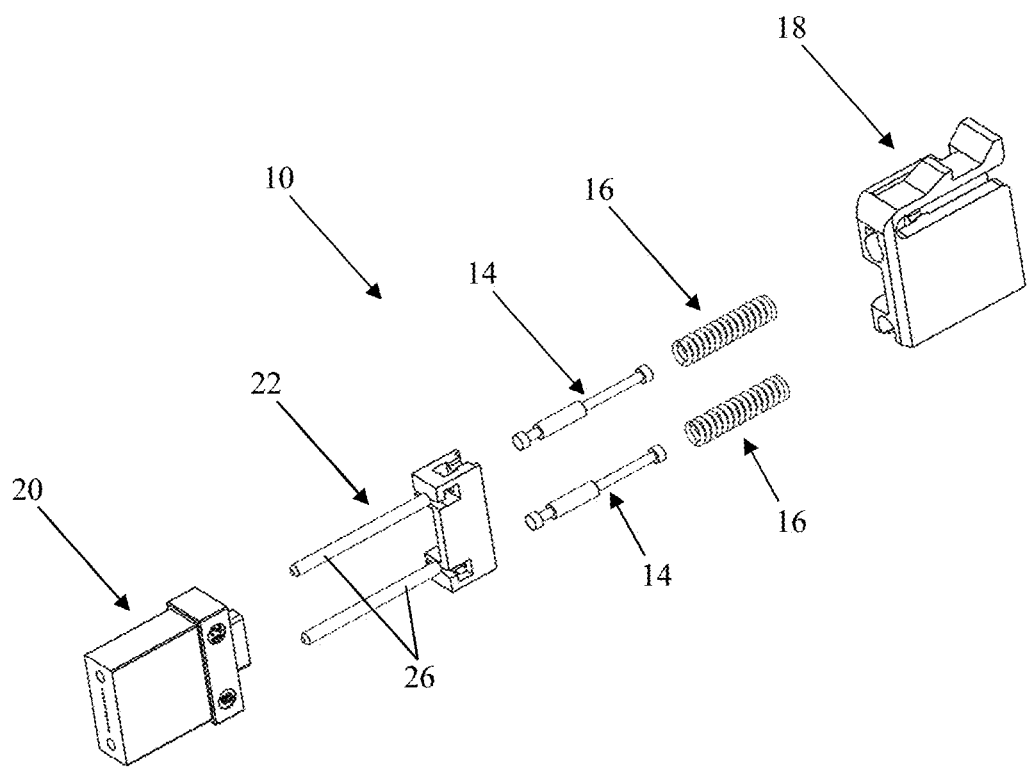
FIG. 4 is an exploded view of the fiber optic connector of FIG. 3.

Referring to FIGS. 3 and 4, a fiber optic connector according to one embodiment of the present disclosure is generally indicated at reference numeral 10. The fiber optic connector 10 (e.g., a first fiber optic connector) forms a fiber optic connection with a second fiber optic connection C (see generally FIG. 8). When coupled together, the fiber optic connectors 10, C form an optical connection (e.g., a fiber optic connection) that enables communication (e.g., optical communication) between different fiber optic components (e.g., cables, devices, etc.) in an optical communications network. The fiber optic connectors 10, C are attached to ends of fiber optic cables to couple the cables together, although other arrangements are within the scope of the present disclosure. In the illustrated embodiment, the fiber optic connector 10 is a male fiber optic connector configured to mate with (e.g., be inserted in) the female second fiber optic connector C. Other configurations of the fiber optic connector 10 are within the scope of the present disclosure. For example, the fiber optic connector 10 can be a female fiber optic connector, as discussed in more detail below, configured to mate (e.g., receive) a male second fiber optic connector. In another example, the connector could make electrical or other types of connections instead of or in addition to an optical connection. The second optical connector C can be any suitable receptacle for connecting with the fiber optic connector 10.

Figure 7:
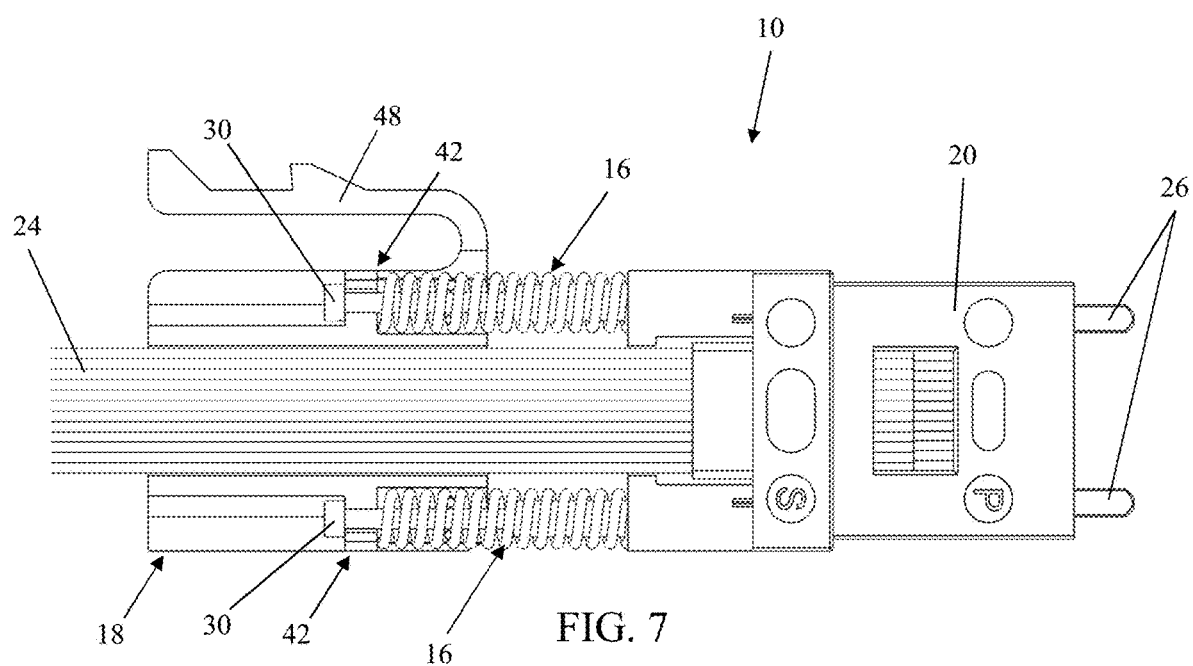
FIG. 7 is a side elevation of the fiber optic connector in an at rest position, a housing of the fiber optic connector shown in section to reveal interior details.
Figure 8:
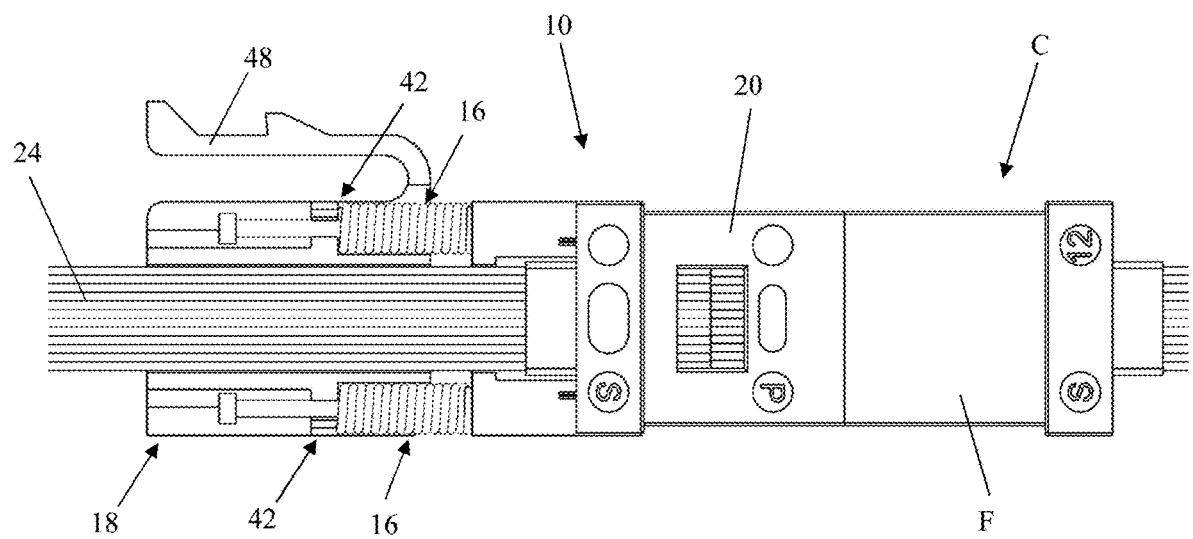
FIG. 8 is a side elevation of the fiber optic connector connected to a ferrule of a second fiber optic connector with the fiber optic connector in a compressed position, and the housing of the fiber optic connector shown in section to reveal interior details.
Figure 9:
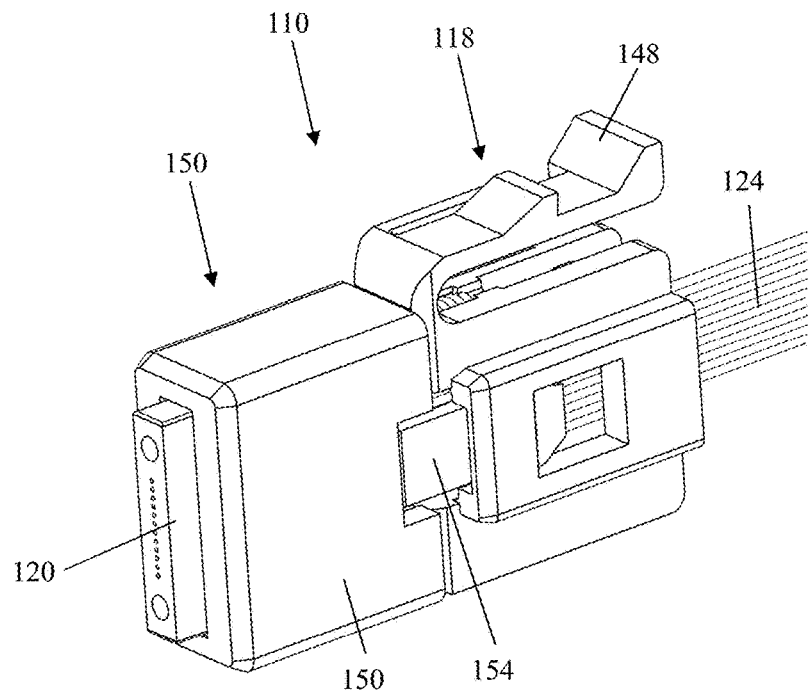
FIG. 9 is a perspective of another embodiment of the fiber optic connector.
Figure 10:
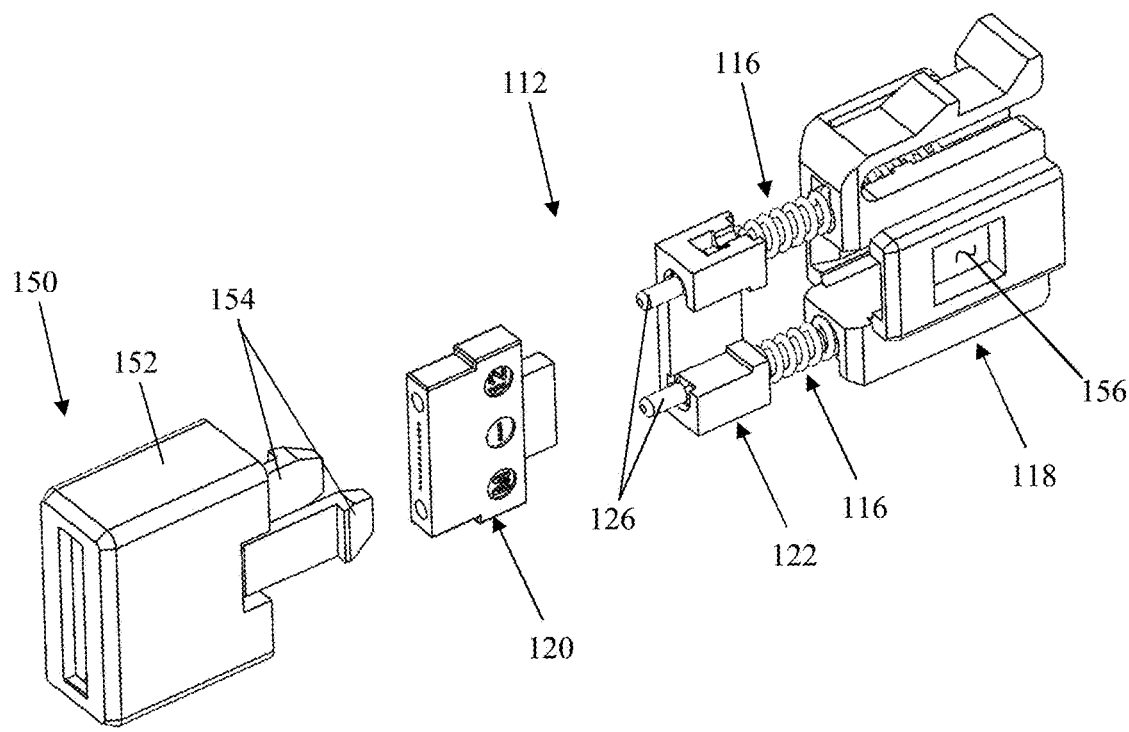
FIG. 10 is an exploded view of the fiber optic connector of FIG. 9.

The fiber optic connector 10 includes a ferrule assembly 12, spring holders 14 (broadly, at least one spring holder), springs 16 (broadly, at least one spring) and a housing 18. In the illustrated embodiment, the fiber optic connector 10 includes two spring holders 14 and two springs 16. The housing 18 is generally disposed at the proximal end of the fiber optic connector 10 and the ferrule assembly 12 is generally disposed at the distal end of the fiber optic connector. The housing 18 includes a latch arm for releasably connecting the fiber optic connector 10 to the second fiber optic connector C or other structure. The ferrule assembly 12 includes a ferrule 20 and a pin keeper 22. The ferrule 20 is configured to form an optical connection with the second fiber optic connector C (FIG. 8). Specifically, the ferrule 20 mates with (e.g., engages) a ferrule F of the second fiber optic connector C (other components of the second fiber optic connector are not shown). The ferrule is connected to the end of the fiber optic cable 24 (FIGS. 7 and 8). The fiber optic cable 24 extends proximally from the ferrule 20. The pin keeper 22 is coupled to the ferrule 20 (e.g., the proximal end of the ferrule). The pin keeper 22 includes pins 26 (broadly, at least one pin) that extends generally distally. The pins 26 extend distally into the ferrule 20 to couple the pin keeper 22 and ferrule together. In the illustrated embodiment, the ferrule assembly 12 is a male ferrule assembly. Accordingly, the pins 26 of the pin keeper 22 extend through ferrule 20 and extend distally out of the ferrule. These pins 26 are configured to form a mechanical transfer (MT) connection with the second (e.g., female) fiber optic connector C. When the fiber optic connectors 10, C are coupled together, the pins 26 extend into the second fiber optic connector. In other embodiments, the ferrule assembly 12 may be a female ferrule assembly, as described below. As shown, the ferrule assembly 12 (e.g., the ferrule 20 and the pin keeper 22) is disposed distally of the housing 18. As will be explained in more detail below, the ferrule assembly 12 is movable (e.g., proximally and distally movable) relative to the housing 18.

Figure 6:
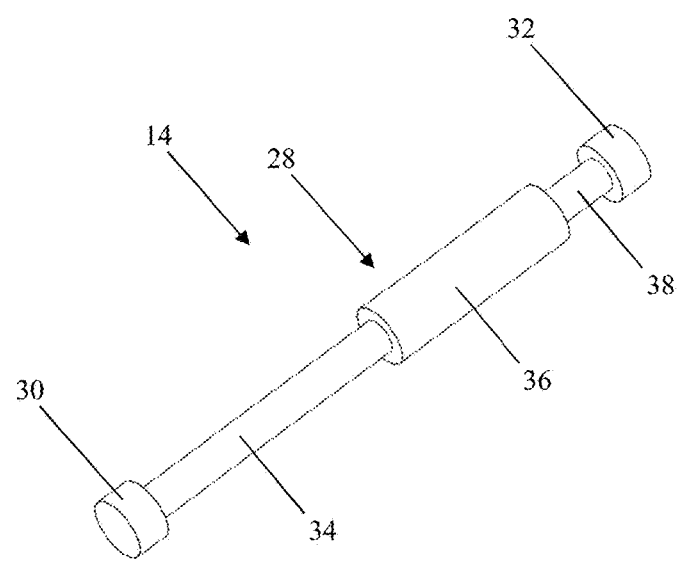
FIG. 6 is a perspective of a spring holder of the fiber optic connector.

Referring to FIGS. 4 and 6, the spring holders 14 are generally identical. Accordingly, one spring holder 14 will now be described in further detail herein with the understand that the other spring holder has essentially the same construction. The spring holder 14 operatively couples the ferrule 20 (broadly, the ferrule assembly 12) to the housing 18. Specifically, the spring holder 14 couples the pin keeper 22 to the housing 18. The spring holder 14 is movable relative to at least one of the housing 18 or the ferrule 20 to enable the ferrule to move proximally and distally relative to the housing. In the illustrated embodiment, the spring holder 14 is coupled to the housing 18 and is movable relative to the housing. In other embodiments, the spring holder may be movably coupled to the pin keeper 22 (broadly, movable relative to the ferrule 20). The proximal and distal movement of the spring holder 14 enables the ferrule 20 to move proximally and distally relative to the housing 18.

The spring holder 14 includes a shaft 28 with proximal and distal ends. The shaft 28 of the spring holder 14 is coupled to the housing 18 and the pin keeper 22. In the illustrated embodiment, the shaft 28 includes a narrow (e.g., recessed) proximal portion 34, a wide intermediate portion 36 and a narrow (e.g., recessed) distal portion 38. The narrow proximal portion 34 of the shaft 28 is coupled to the housing 18 and the narrow distal portion 38 of the shaft is coupled to the pin keeper 22. The narrow proximal portion 34 of the shaft is elongate, enabling the spring holder to slide relative to the housing 18, as explained in more detail below. The spring holder 14 also includes a stop 30 (e.g., a distal stop) that engages the housing 18 to limit the distal movement of the spring holder, and by extension the ferrule 20, relative to the housing. In the illustrated embodiment, the distal stop 30 is disposed at the proximal end of the spring holder 14 (e.g., the proximal end of the shaft 28). The spring holder 14 also includes a stop 32 (e.g., a proximal and/or distal stop) that engages the pin keeper 22. The stop 32 and the distal end of the intermediate portion 36 are engageable with the pin keeper 22 to restrict proximal and/or distal movement of the spring holder relative to the pin keeper 22 (broadly, the ferrule 20). In the illustrated embodiment, the stop 32 is disposed at the distal end of the spring holder 14 (e.g., the distal end of the shaft 28).

Figure 5:
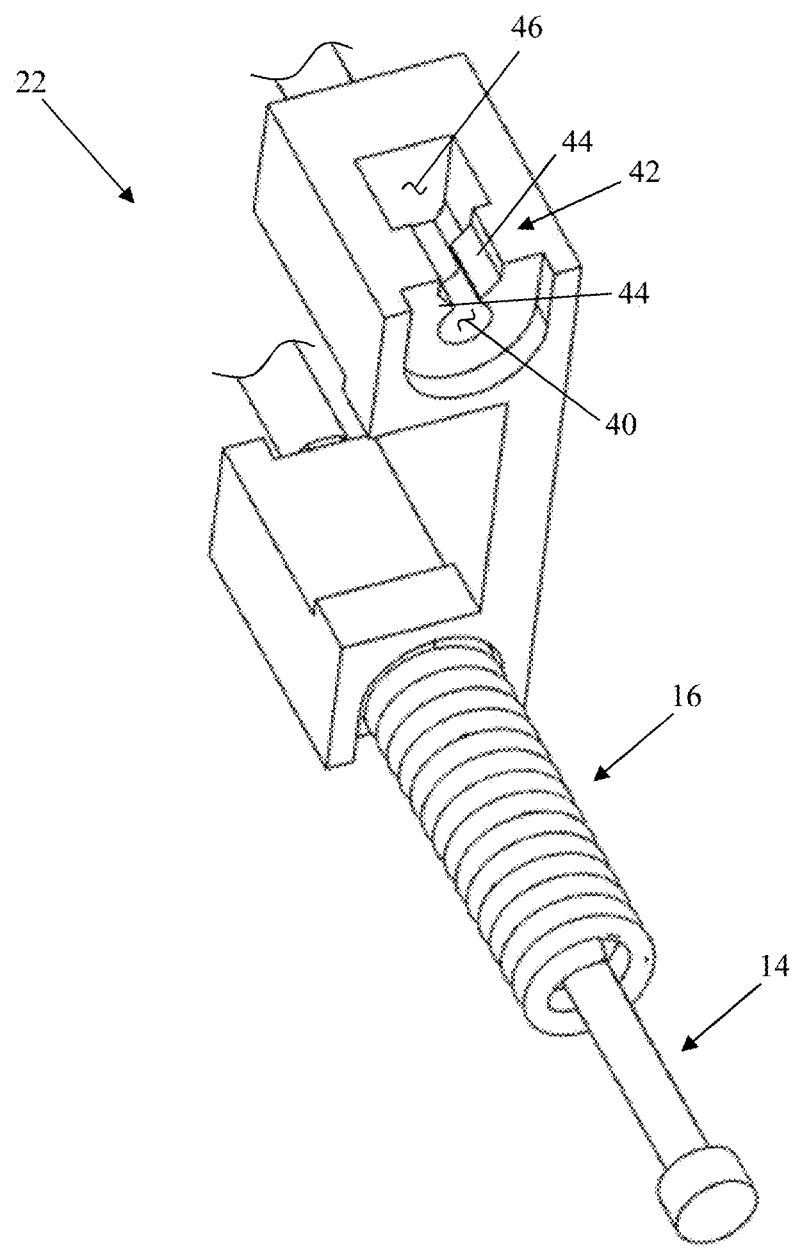
FIG. 5 is a fragmentary perspective of a pin keeper of the fiber optic connector.

Referring to FIG. 5, the spring holder 14 and pin keeper 22 form a snap-fit connection that couples the two components together. The pin keeper 22 includes a retainer 42 (e.g., a spring holder retainer) that defines a spring holder opening 40 (e.g., spring holder channel). The spring holder 14 is disposed within the spring holder opening 40. The spring holder opening 40 has opposite open proximal and distal ends through which spring holder 14 extends. The spring holder opening 40 is sized and shaped to receive the narrow distal portion 38 of the shaft 28. The spring holder opening 40 has a cross-sectional shape that generally corresponds to (e.g., matches) the cross-sectional shape of the narrow distal portion 38 of the shaft 28. In the illustrated embodiment, the spring holder opening 40 is a channel with an open side defined by opposing shoulders or lips 44 of the retainer 42. The shoulders 44 are resiliently deflectable to permit the shaft 28 to be inserted into the spring holder opening 40. As the shaft 28 of the spring holder 14 is inserted through the open side and into the spring holder opening 40, the shaft deflects or deforms the shoulders 44. Once the shaft 28 is in the spring holder opening 40, the shoulders 44 return or snap-back to their undeformed state (FIG. 5) securing the shaft in the spring holder opening. The pin keeper 22 also defines a stop recess 46 sized and shaped to receive the stop 32 of the spring holder 14. The stop 32 is disposed in the stop recess 46 when the spring holder 14 is coupled to the pin keeper 22. The stop 32 engages a distal surface of the retainer 42 (that partially defines the recess 46) to inhibit the spring holder 14 from moving proximally relative to the pin keeper 22. The stop 32 may also engage a proximal surface of the pin keeper 22 (that partially defines the recess 46) to inhibit the spring holder 14 from moving distally relative to the pin keeper. In addition, the wide intermediate portion 36 of the shaft 28 may also engage a proximal surface of the retainer 42 to inhibit the spring holder 14 from moving distally relative to the pin keeper 22. In this embodiment the length of the retainer 42 (e.g., spring holder opening 40) is generally the same as or slightly shorter than the length of the narrow distal portion 38 of the shaft 28 of the spring holder 14. Accordingly, the spring holder 14 is generally rigidly coupled (relative to proximal and distal movement) to the pin keeper 22 (e.g., the spring holder is substantially inhibited from moving proximally or distally relative to the pin keeper).

As is apparent, the pin keeper 22 includes two retainers 42 for coupling both spring holders 14 to the pin keeper. The retainers 42 are disposed on opposite sides of a fiber optic channel defined by the pin keeper 22 and through which the fiber optic cable 24 extends. Accordingly, the spring holders 14 are disposed on generally opposite sides of the fiber optic cable 24.

Referring to FIGS. 7 and 8, the housing 18 (e.g., latch housing) of the fiber optic connector 10 is configured to couple to at least one of an adapter housing AH (see generally FIG. 12) and/or a second fiber optic connector C. In the illustrated embodiment, the housing 18 includes at latch 48 configured to secure the fiber optic connector 10 to at least one of an adapter housing AH and/or a second fiber optic connector C. The housing 18 has proximal and distal ends.

The housing 18 includes retainers 42, which are similar or identical to the retainers of the pin keeper 22 (and thus identical reference numbers are used and a detailed description is omitted), to couple the spring holders 14 to the housing. Each retainer 42 of the housing 18 couples to the narrow proximal portion 34 of the shaft 28 (e.g., the narrow proximal portion is disposed in the spring holder opening 40). The narrow proximal portion 34 of the shaft 28 is longer than the length of the retainer 42 (e.g., spring holder opening 40) enabling the spring holder 14 to move (e.g., slide) proximally and distally relative to the housing 18 (e.g., retainer). Each spring holder 14 moves proximally and distally in the spring holder opening 40 defined by the corresponding retainer 42 of the housing 18 to enable the ferrule assembly 12 (e.g., ferrule 20) to move proximally and distally relative to the housing. The housing 18 defines proximal and distal spring holder spaces on the proximal and distal side, respectively, of each retainer 42. The distal spring holder space extends from the retainer 42 to the distal end of the housing 18. The proximal and distal spring holder spaces provide the clearance necessary to allow the spring holder 14 to move relative to the housing 18. Each spring holder 14 extends distally from its corresponding retainer 42 of the housing 18, through the distal spring holder space and out of the distal end of the housing, to the ferrule assembly 12. The retainers 42 are disposed on opposite sides of a fiber optic space or channel defined by the housing 18 and through which the fiber optic cable 24 extends.

Referring to FIGS. 4, 5, 7 and 8, each spring 16 of the fiber optic connector 10 is mounted on one of the spring holders 14. Each spring 16 biases the ferrule assembly 12 (e.g., ferrule 20) in a distal direction away from the housing 18. Specifically, each spring 16 biases the ferrule assembly 12 (e.g., ferrule 20) toward the second fiber optic connector C when the ferrule forms an optical connection with the second fiber optic connector to maintain the optical connection. In the illustrated embodiment, each spring 16 is a coil spring. Each spring 16 defines an interior through which one of the spring holders 14 (e.g., shafts 28) extends through to mount the spring. By extending through the springs 16, each spring holder 14 limits the lateral movement of the spring (as the spring compresses and expands) reducing the spring rattle. Spring rattle can cause the fiber optic connectors, such as fiber optic connector 1, to fail such as by causing the spring to become loose or by loosening (and possibly disconnecting) the fiber optic cable from the ferrule. Each spring 16 engages the housing 18 and the ferrule assembly 12 (e.g., pin keeper 22). Specifically, a proximal end of each spring 16 engages a retainer 42 of the housing 18 and a distal end of each spring engages a retainer of the pin keeper 22. As a result, the springs 16 push or bias the ferrule assembly 12 in a distal direction, away from the housing 12. Each spring 16 is also partially disposed in the distal spring holder space of the housing 18, which helps reduce the overall length of the fiber optic connector 10. Moreover, when the springs 16 are compressed, they compress into the distal spring holder space, further reducing the overall length of the fiber optic connector 10 when the fiber optic connector is compressed.

Referring to FIG. 7, the fiber optic connector 10 is shown at rest. The springs 16 have pushed the spring holders 14 and ferrule assembly 12 distally (e.g., in a distal direction), with the distal stops 30 of the spring holders limiting any further distal movement. In this at rest position, the spring holders 14 and ferrule assembly 12 can only move proximally (e.g., in a proximal direction). In operation, when the fiber optic connector 10 is connected to the second fiber optic connector C, the ferrule 20 of the fiber optic connector engages the ferrule F of the second fiber optic connector. As a result of this engagement, the spring holders 14 and ferrule assembly 12 are moved proximally against the bias of the springs 16. As the ferrule assembly 12 moves proximally, the spring holders 14 (e.g., the narrow proximal portion 34 of the shafts 28) move relative to the housing 18 (e.g., slide in the spring holder openings 40 of the retainers 42 of the housing). This proximal movement compresses the springs 16 and moves the fiber optic connector 10 to a compressed position, as shown in FIG. 8. Full compression of the springs 16 and/or engagement between the housing 18 (e.g., retainers 42) and the wide intermediate portions 36 of the shafts 28 of the spring holders 14 limits the amount of proximal movement. Due to the proximal movement of the ferrule assembly 12 caused by the engagement with the second fiber optic connector C, the distal stops 30 are no longer engaged with the housing 18 and the springs 16 now bias or push the ferrule assembly (e.g., ferrule 20) against the ferrule F of the second fiber optic connector C to help maintain the integrity of the optical connection between the two ferrules.

Referring to FIGS. 9-12, another embodiment of the fiber optic connector according to the present disclosure is generally indicated by reference numeral 110. Fiber optic connector 110 is generally analogous to fiber optic connector 10 and, thus, for ease of comprehension, where similar, analogous or identical parts are used, reference numerals "100" units higher are employed. Accordingly, unless clearly stated or indicated otherwise, the above descriptions regarding fiber optic connector 10 also apply to fiber optic connector 110.

Figure 12:
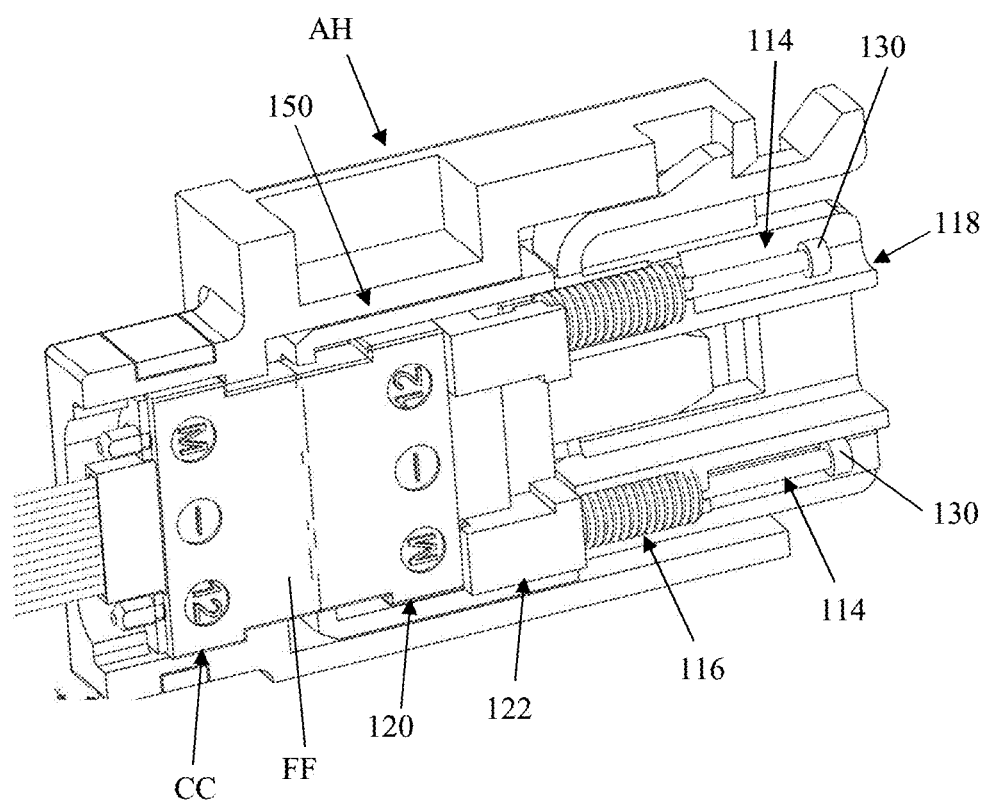
FIG. 12 is a perspective in longitudinal section of the fiber optic connector of FIG. 9 coupled to an adapter housing and connected to a ferrule of a second fiber optic connector.

The fiber optic connector 110 is a female fiber optic connector that mates with a male (e.g., second) fiber optic connector CC (FIG. 12). The pin keeper 122 of the ferrule assembly 12 includes pins 126 that extend into (but not through) the ferrule 120. Accordingly, the openings in the ferrule 120, in which the pins 126 are received, are able to also receive the pins of the second fiber optic connector CC (e.g., pins 26 of fiber optic connector 10) to form the mechanical transfer connection between the two connectors. As shown in FIG. 12, the fiber optic connector 110 and second fiber optic connector CC can be inserted into an adapter housing AH to form the optical connection between the connectors (e.g., ferrules 120, FF).

In this embodiment, the fiber optic connector 110 includes an outer or ferrule assembly housing 150. The ferrule assembly housing 150 includes a shroud 152 defining an interior sized and shaped to receive (e.g., fit) the ferrule assembly 112 (e.g., ferrule 120, pin keeper 122). The ferrule assembly 112 is disposed in the interior of the shroud 152. The shroud 152 has a distal end with a ferrule opening. The ferrule 120 of the ferrule assembly 112 extends distally (from the interior of the shroud 152) through the ferrule opening, in order to engage the ferrule FF of the second fiber optic connector CC. In this embodiment, the ferrule assembly housing 150 is coupled (e.g., attached) to the housing 118. In particular, the ferrule assembly housing 150 and housing 118 form a snap-fit connection. The ferrule assembly housing 150 includes two latches 154 (broadly, at least one latch) that engage the housing 118 to secure the two housings together. The housing 118 includes a latch opening 156 aligned with each latch 154. The latches 154 are disposed on opposite sides of and extend proximally from the shroud 152. The latches 154 are resiliently deflectable and deflect inward (e.g., toward one another), as the latches are inserted into the housing 118. Once the latches 154 are aligned with the openings 156, the latches return or snap-back toward their undeformed state, securing the ferrule assembly housing 150 and housing 118 together.

Figure 11:
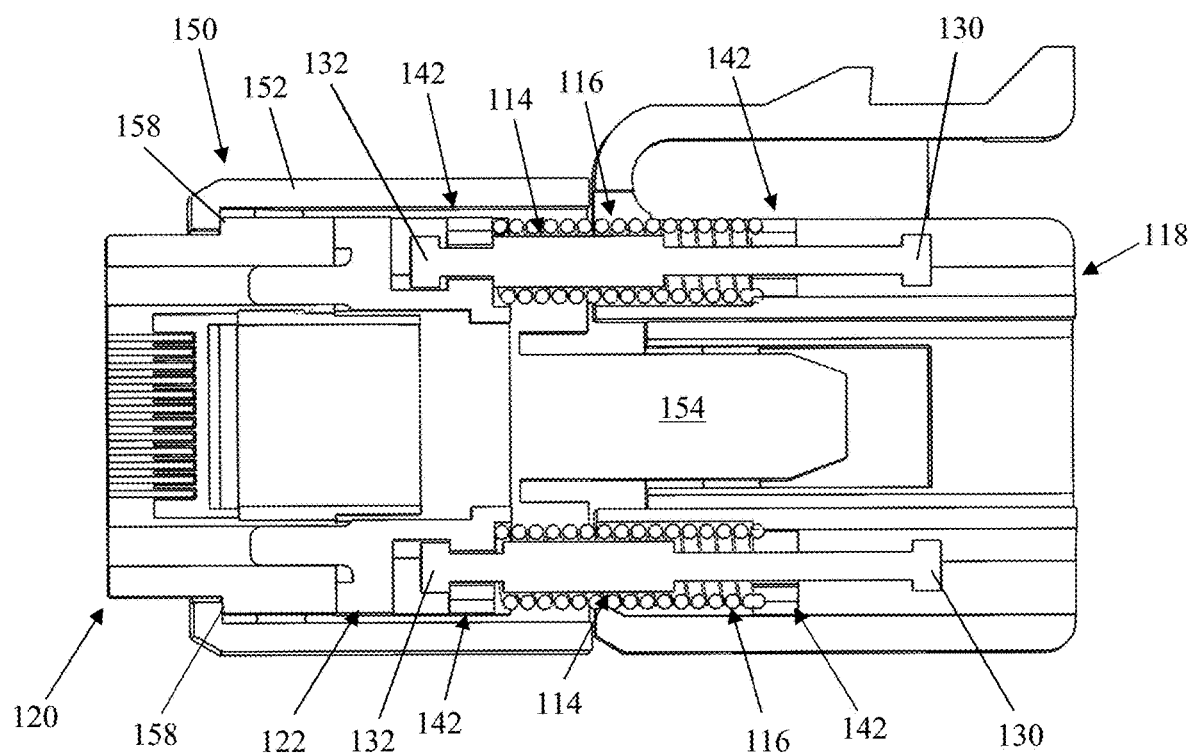
FIG. 11 is a longitudinal section of the fiber optic connector of FIG. 9.

Referring to FIG. 11, the springs 116 bias the ferrule assembly 112 distally, against the ferrule assembly housing 150. The ferrule 120 includes shoulders or lips 158 that engage the shroud 152 of the ferrule assembly housing 150. Accordingly, in this embodiment, the ferrule assembly housing 150 limits the distal movement of the ferrule assembly 112 (not the distal stops 130 of the spring holders 114). When the fiber optic connector 110 is assembled, the ferrule assembly housing 150 positions the ferrule assembly 112 in an initial, at rest and partially compressed position, as shown in FIG. 11. In this partially compressed position, the springs 116 are partially compressed and bias or push the ferrule 120 distally, against the shroud 152 of the ferrule assembly housing 150. In addition, the distal stops 130 of the spring holders 114 are spaced proximally apart from the retainers 42 of the housing 118. In operation, when the fiber optic connector 110 is connected to the second fiber optic connector CC, the ferrule 120 of the fiber optic connector engages the ferrule FF of the second fiber optic connector. As a result of this engagement, the spring holders 114 and ferrule assembly 112 are moved proximally against the bias of the springs 116. This proximal movement further compresses the springs 116 and moves the fiber optic connector 110 toward (e.g., to) a more fully compressed position, as shown in FIG. 12. Due to the proximal movement of the ferrule assembly 112, the ferrule 120 is longer engaged with the ferrule assembly housing 150 (e.g., spaced proximally therefrom) and the springs 116 now bias or push the ferrule assembly (e.g., ferrule 20) against the ferrule FF of the second fiber optic connector CC to help maintain the integrity of the optical connection between the two ferrules.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A fiber optic connector comprising:
a housing having proximal and distal ends and including a latch configured to secure the fiber optic connector to a second fiber optic connector;
a ferrule configured to form an optical connection with a second fiber optic connector, the ferrule being disposed distally of the housing, the ferrule configured to terminate an optical fiber extending proximally from the ferrule;
a spring holder operatively connecting the ferrule to the housing, the spring holder being configured to move relative to at least one of the housing and the ferrule to enable the ferrule to move proximally and distally relative to the housing; and
a spring biasing the ferrule in a distal direction away from the housing, the spring being mounted on the spring holder;
wherein the spring holder is a first spring holder and the spring is a first spring, wherein the fiber optic connector further comprises:
a second spring holder operatively connecting the ferrule to the housing, the second spring holder movable relative to at least one of the housing and the ferrule to enable the ferrule to move proximally and distally relative to the housing; and
a second spring biasing the ferrule in the distal direction away from the housing, the second spring mounted on the second spring holder,
the first spring holder and the second spring holder configured to mount the first spring and the second spring on diametrically opposite sides of the optical fiber and such that neither the first spring nor the second spring is coiled around the optical fiber.

2. The fiber optic connector of claim 1, wherein the spring holder is coupled to the housing and is movable relative to the housing.

3. The fiber optic connector of claim 2, wherein the spring holder includes a stop that engages the housing to limit distal movement of the ferrule relative to the housing.

4. The fiber optic connector of claim 3, wherein the stop is at a proximal end of the spring holder.

5. The fiber optic connector of claim 2, wherein the housing includes a spring holder opening and the spring holder is disposed within the spring holder opening, the spring holder being configured to move proximally and distally in the spring holder opening to enable the ferrule to move proximally and distally relative to the housing.

6. The fiber optic connector of claim 1, wherein the spring is arranged to bias the ferrule distally toward the second fiber optic connector when the ferrule forms an optical connection with the second fiber optic connector to maintain the optical connection.

7. The fiber optic connector of claim 1, wherein the spring engages the housing.

8. The fiber optic connector of claim 1, further comprising a pin keeper coupled to the ferrule, the pin keeper including at least one pin extending distally through the ferrule and configured to form a mechanical transfer connection with the second fiber optic connector.

9. The fiber optic connector of claim 8, wherein the spring holder is coupled to the pin keeper.

10. The fiber optic connector of claim 9, wherein the spring holder includes a stop that engages the pin keeper to inhibit proximal movement of the spring holder relative to the pin keeper.

11. The fiber optic connector of claim 10, wherein the stop is at a distal end of the spring holder.

12. The fiber optic connector of claim 11, wherein the spring engages the pin keeper.

13. The fiber optic connector of claim 12, wherein the spring holder forms a snap-fit connection with the pin keeper.

14. The fiber optic connector of claim 13, wherein the pin keeper defines a channel sized and shaped to receive a shaft of the spring holder and a stop recess sized and shaped to receive the stop of the spring holder.

* * * * *